Patented Mar. 16, 1948

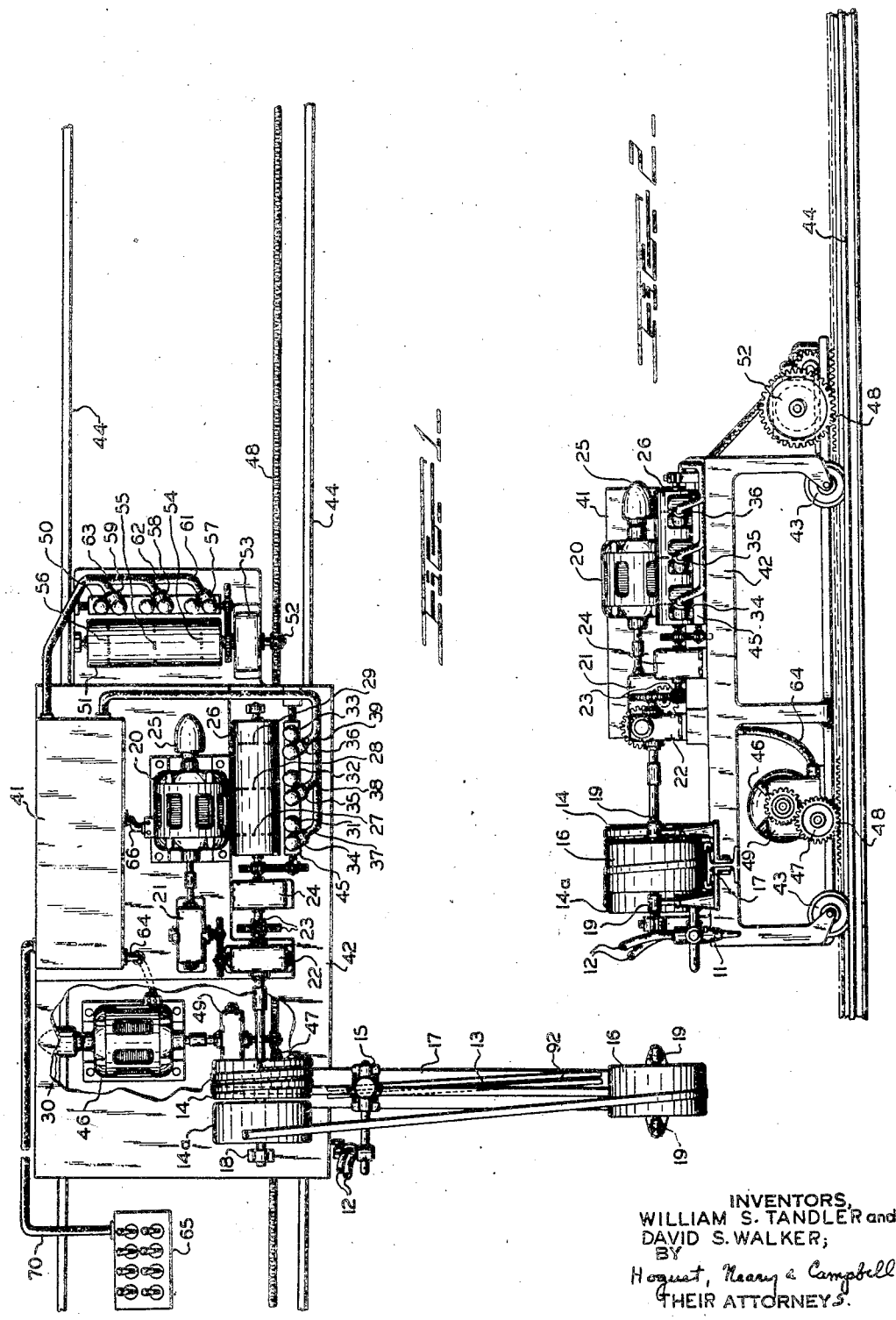

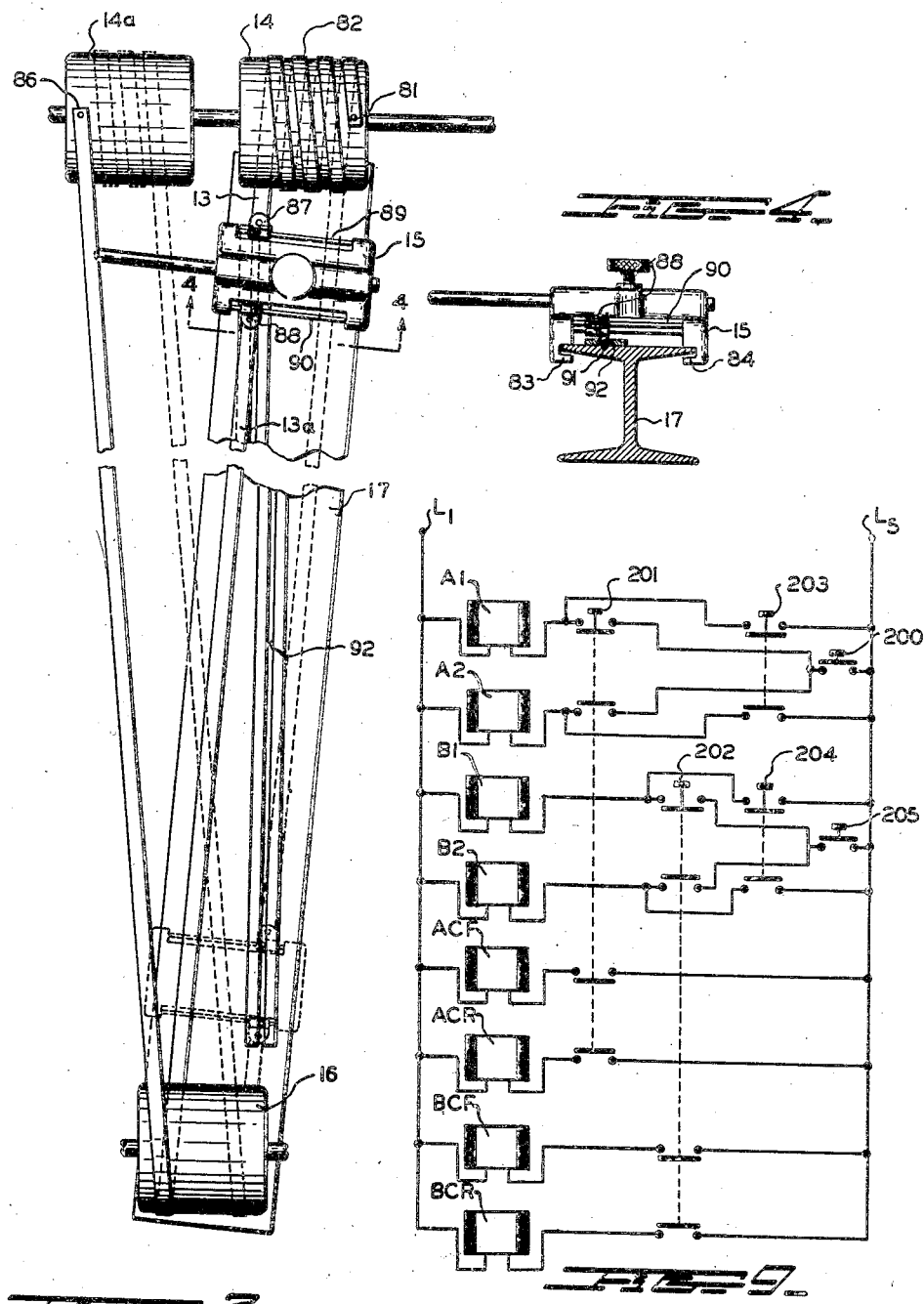

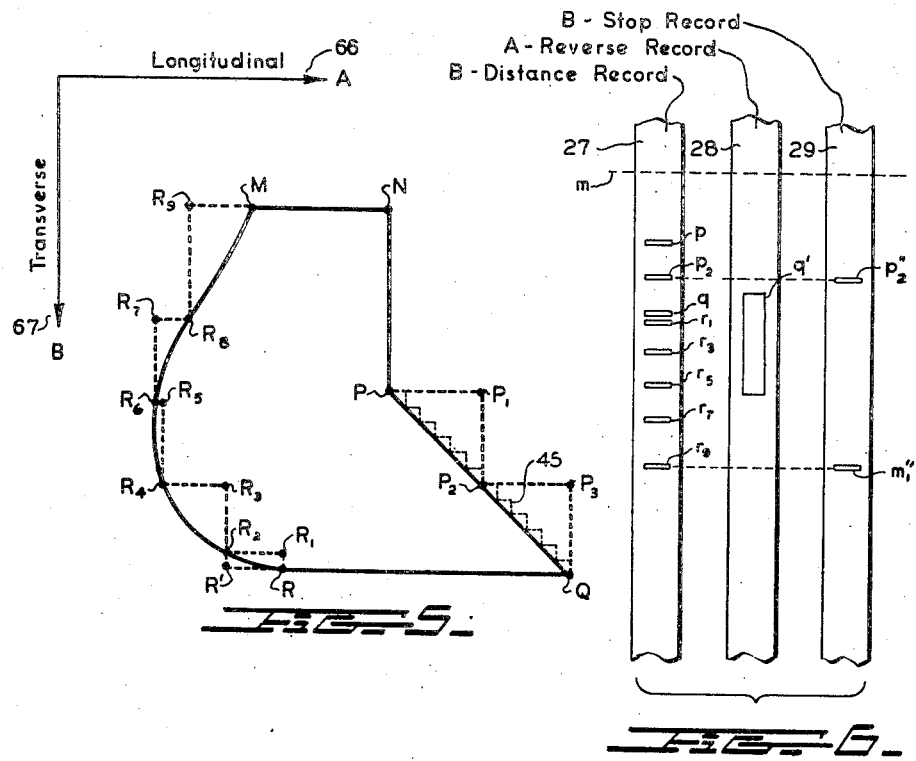
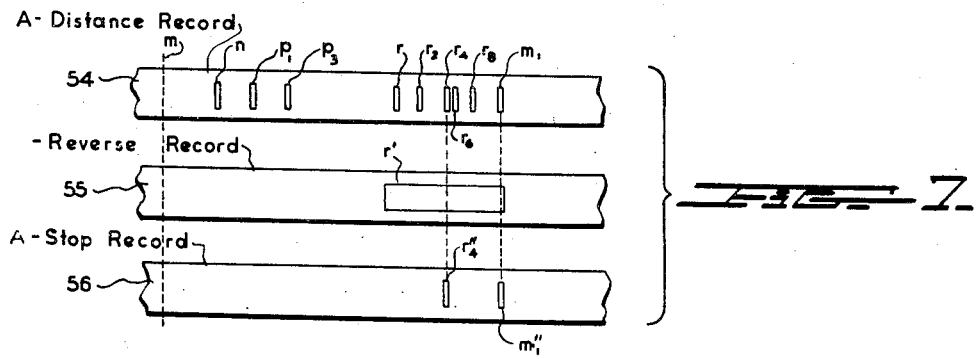

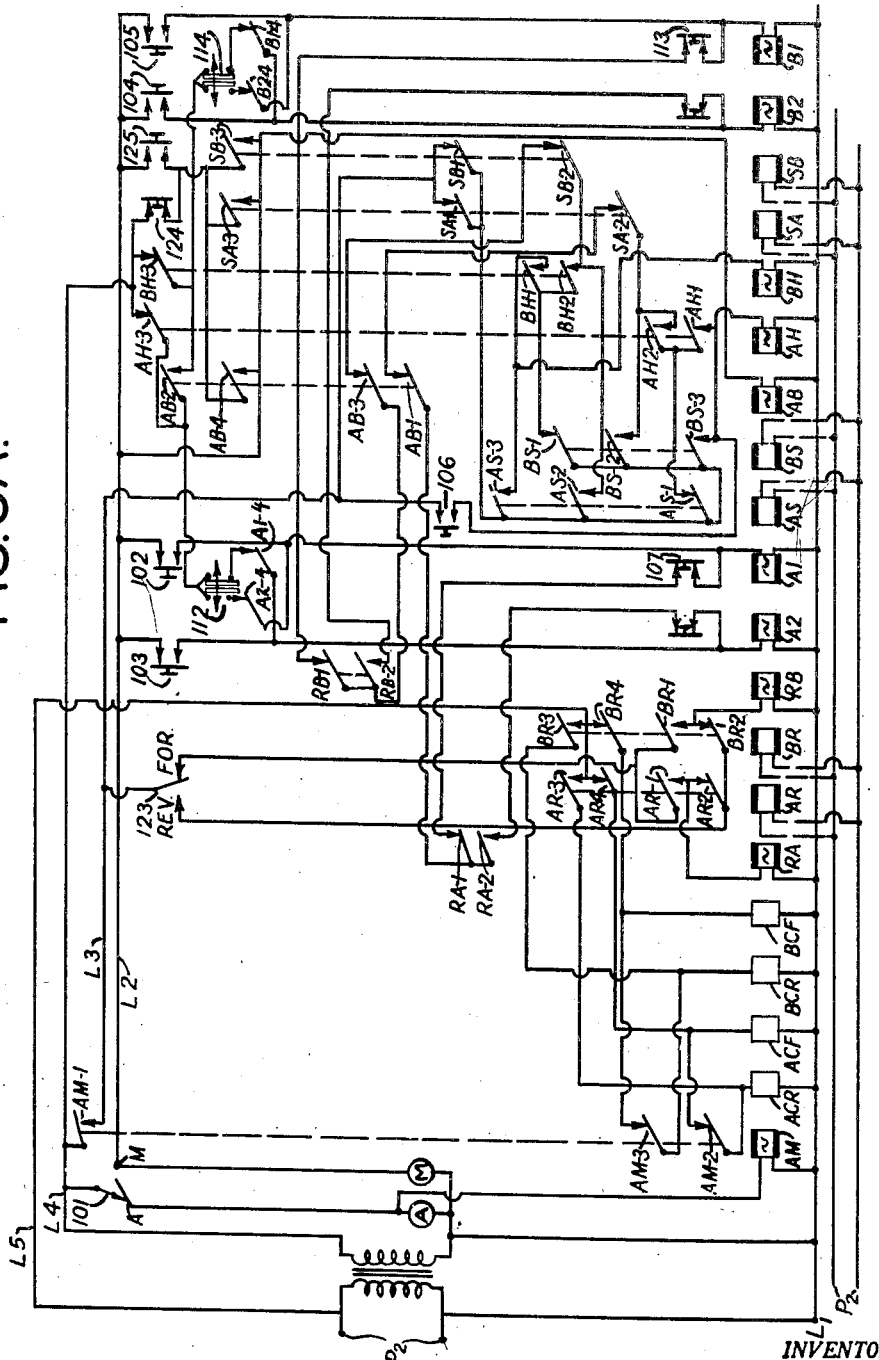

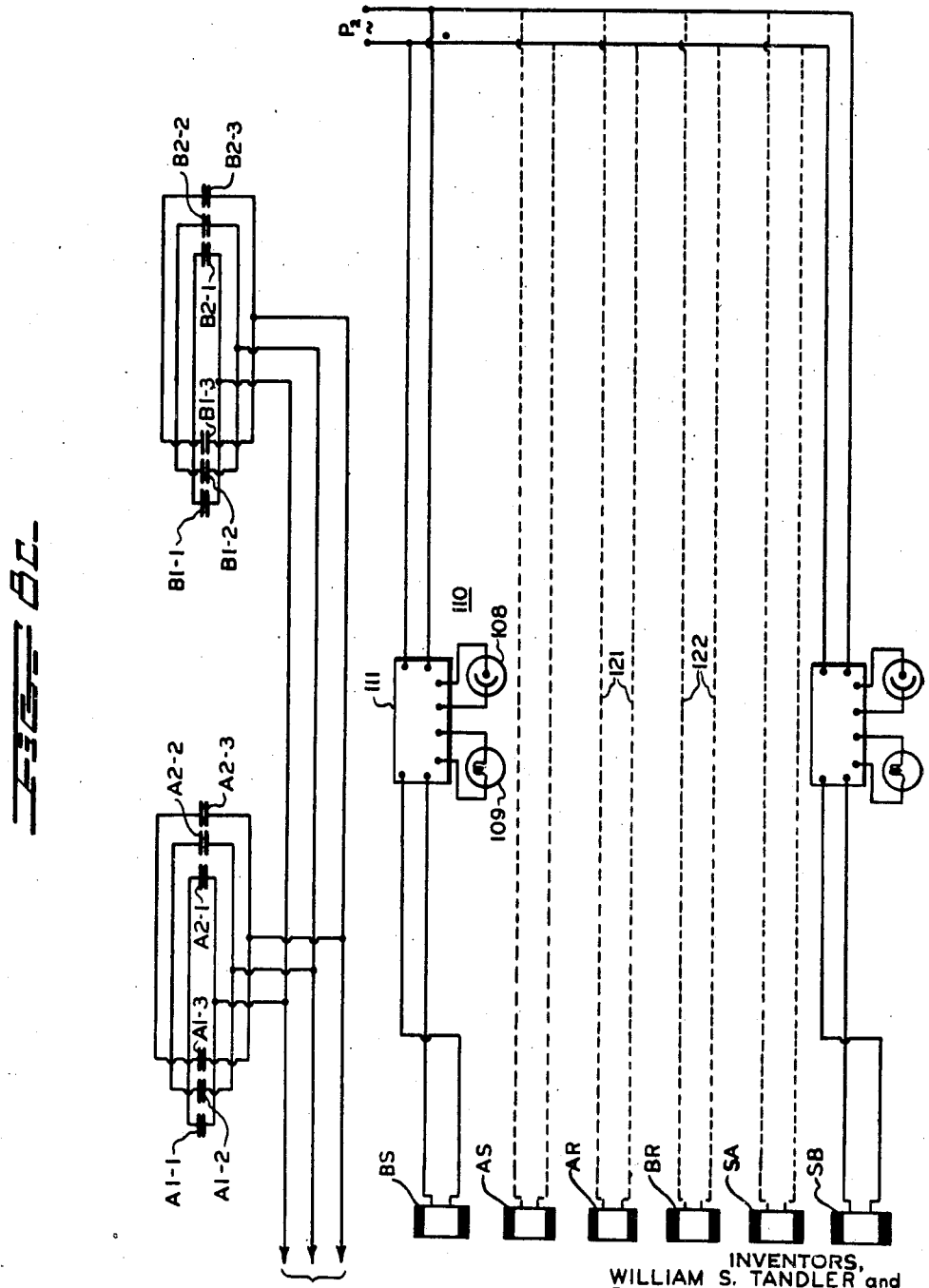

2,438,098

UNITED STATES PATENT OFFICE 2,438,098

PHOTOELECTRIC CONTROL MECHANISM FOR FLAME-CUTTING DEVICES

William S. Tandler and David S. Walker, New York, N. Y., assignors, by mesne assignments, to Reconstruction Finance Corporation, New York, N. Y., a corporation of the United States Application October 9, 1942, Serial No. 461,404

15 Claims. (Cl. 318—162)

This invention relates to photo-electric devices for use in the automatic control of manufacturing operations and relates more particularly to photo-electric cell devices for automatically controlling the operation of machining or cutting devices such as, for example, oxyacetylene torches or other flame-cutting devices.

Many industries use cutting torches for cutting out articles of complex outlines from metal, for example, in the ship-building art steel plates are cut into complex shapes in order to fit together to form the hull, bulkheads, decks, etc., of ships. In this art it has been customary to construct a full-scale template or pattern for each part required, and then to punch-mark a steel sheet with the required outline through the template. A cutting torch is then manually guided over the marks to cut out the outlined article.

This type of operation is not entirely satisfactory for the reasons that production rates are low and a high degree of skill is required to manipulate the cutting torch accurately. The pattern must be laid out on each sheet, thereby causing considerable delay in producing a finished article. Other errors and delays arise during the cutting operation. The high flame intensity of the cutting torch necessitates the use of dark cobalt glasses for the workmen, so that the punch-marks are difficult to see. As a result, the cutting operation must be stopped from time to time in order to check the accuracy of the cut being made. Moreover, the template is usually made from heavy paper, wood or the like and, therefore, is difficult to produce, transport and store without damage.

In order to overcome the disadvantages of manual flame-cutting, it has been suggested that a pantograph device be provided to guide the torch. A template, in the nature of a duplicate of the article being produced, is used to control the motion of the torch. While such a pantograph mechanism is an improvement over manual operation of a torch, it leaves much to be desired from the standpoints of accuracy, speed in cutting and versatility in the cutting of various shapes.

Inasmuch as the pantograph mechanism is guided by the template, the template is subject to wear with a resulting loss of accuracy. Moreover, the template must be fixed in position with relation to the pantograph and the metal being cut must also be disposed in a predetermined relationship to the torch and template in order to assure movement of the torch over the metal. The templates, being of the same size as the article being produced, take up a considerable amount of space, especially when large plates are being cut, and thus a proportionately larger area must be set aside for location of the flame-cutting device. Most importantly, the manufacture and replacement of the template is difficult and thus the prior devices are limited in their capacity to produce readily a wide variety of differently shaped articles.

An object of the invention is to provide apparatus which is adapted to execute automatically any desired outline.

Another object of the present invention is to provide flame-cutting apparatus which may be automatically controlled to cut metal into substantially any desired shape without manual supervision or control and without the use of guide templates.

Another object of the present invention is to provide flame-cutting apparatus which may be controlled by means of an easily and simply made permanent record that can be used indefinitely for duplication of the same pattern, without affecting the accuracy of the record.

Still another object of the present invention is to provide improved apparatus for automatically tracing any desired outline or curve by means of two motors producing right angularly related components of motion to move a tracing member along an outline, said motors being controlled by photo-electric cells and a record system for energizing the cells.

An additional object of the invention is to provide a mechanism for translationally moving an index or tracing member in forward and reverse directions by means of a flexible tape and under the control of a motor or other motive device, while maintaining full synchronism between the rotation of the motor and the motion of the member.

Other objects and advantages of the present invention will become apparent from the following description of a typical form of device embodying the present invention.

For purposes of illustration the invention will be described as embodied in a flame-cutting device, although it is not limited to such devices.

In accordance with the present invention, a cutting torch is moved along perpendicular paths by means of a pair of motors that are controlled by photo-electric cells. The photo-electric cells are energized or deenergized by means of suitable charts, for example, in the form of drums, to control the operation of the motors which move the torch.

More particularly, the device may include a carriage for a cutting torch which is mounted upon a rail or boom for movement in a straight line along the boom. A second perpendicular component of motion is obtained by moving the entire boom at right angles to the path of movement of the carriage along the boom so that the torch can be moved in any combination of straight or curved lines, as desired.

As a practical matter, it is not possible to cause the torch to traverse accurately a variety of curved or inclined paths of predetermined curvature or incline by means of a pair of motors, for the reason that the speeds of the motors cannot be controlled within sufficiently close limits to maintain the necessary relationship between the two components of motion.

The present invention, therefore, includes mechanisms which cause the motors to operate alternately and thereby cause the torch to traverse a zig-zag path closely corresponding to the desired curvature or incline. Actually, when the torch is moved in short steps in such a zig-zag path, it fuses the serrations so that a substantially smooth edge is produced.

Precise control of the motion of the torch in such a zig-zag path is obtained by rendering the operation of the motors and the control mechanisms dependent upon each other. Thus the control mechanisms are so arranged that one motor is stopped after the torch has moved a predetermined distance and operation of the other motor is initiated. In this way an extremely close relationship between the operation of the motors and the movements of the torch is maintained at all times.

The motors for moving the torch are started and stopped by means of a photo-electric cell system including a pair of control records such as, for example, hollow cylindrical drums provided with index markings.

Precise control of the operation of the motors and displacement of the torch is obtained for the reason that the drum actuated by one motor controls the operation of the other motor. In this way, the control drums for the respective motors are directly related to the movement of the torch and assure that each movement of the torch is related to the immediately preceding motion.

The control record may be easily made in accordance with the present invention by initially tracing a desired outline on a drawing or pattern once and applying markings to the drum at the various points at which one motor is stopped and the other is started. When the various control points have been marked upon the drums and the drums set in their starting position, the motors may be operated by the drums to cause the torch to retrace the pattern. The torch will advance in a given direction until the control point or marking on the drum is sensed by a photo-electric cell, at which time the motor then operating will be stopped and the motor for driving the torch at right angles will begin to operate, thus advancing the torch at right angles to the initial cut. This cutting operation will proceed until a second control point on a drum passes a photo-electric cell at which time the motor then operating will be stopped and the other motor will be energized.

Apparatus of the type described generally above does not require a template for guiding the cutting torch and, therefore, the apparatus can be shifted from place to place. Thus the boom and control mechanism maybe mounted upon rails and can be moved into position to cut one plate while a second plate is being moved into position at a different place to be cut subsequently. The device then may be shifted to cut the second plate while the previously cut plate is removed and replaced with an additional plate to be operated upon by the cutting device.

When cutting plates of large dimensions, it has been found that nearly as much time is required to remove the cut plate and replace it with another plate as is required in the cutting operation. It will be apparent that the ability of the cutting device to be shifted from place to place results in a marked increase in output. Moreover, the device can be equipped with a plurality of torches so that two or more plates can be cut simultaneously without making the device excessively large.

The charts or drums for controlling operation of the motors are not in engagement with any relatively moving parts and thus are not subject to wear. Therefore, they can be used indefinitely for reproducing a desired pattern. However, the device is arranged to permit ready removal and replacement of the drums so that the device can be changed quickly to cut different patterns. Moreover, inasmuch as the device may be provided with mechanism for applying index markings to the drums by merely tracing the outline of an original pattern, new control drums can be prepared easily for simple drawings. The size of the drawings is of little importance, inasmuch as the device can be adjusted to make control drums for full-scale operations from fractional scale drawings.

For a better understanding of the present invention, reference may be had to the following description of the drawings illustrating a typical embodiment of the invention in which:

Figure 1 shows a plan view of the present invention;

Figure 2 shows a longitudinal elevational view of the device of Figure 1;

Figure 3 shows a plan view of the lateral torch drive of Figs. 1 and 2 more in detail;

Figure 4 shows a cross-section of Fig. 3 taken along line 4—4;

Figure 5 shows a diagram of a representative outline to be traced, useful in explaining the operation of the device;

Figures 6 and 7 show developed views of representative control records for producing the outline of Fig. 5, Figures 8A, 8B and 8C show a complete schematic wiring diagram for controlling the cutter; and Figure 9 shows a schematic wiring diagram for controlling the system during the making of the control record.

Figure 8B:
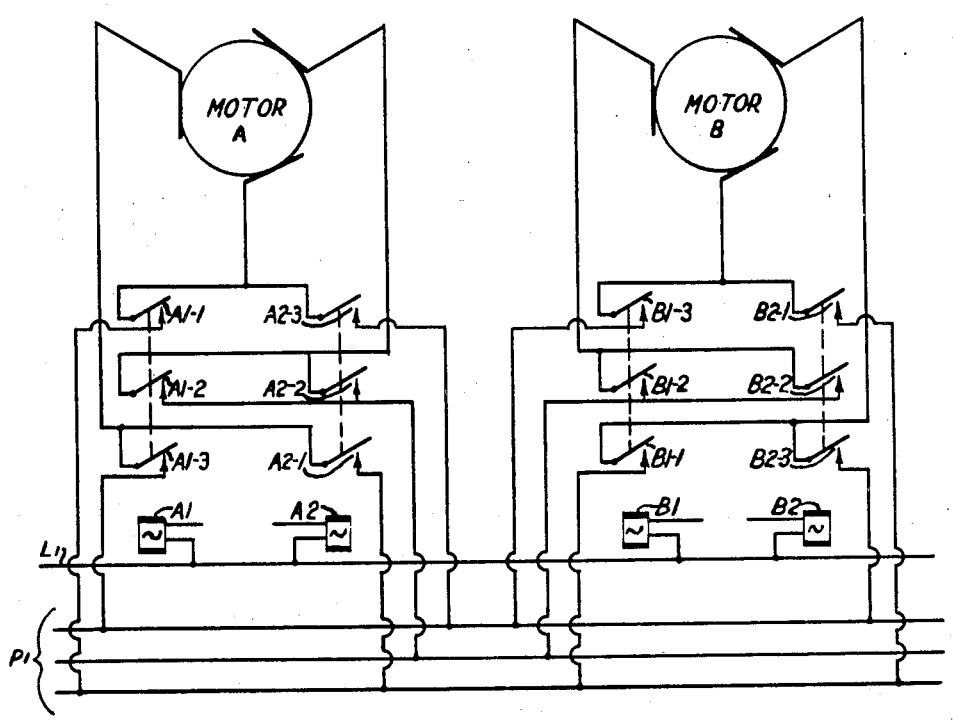

Figures 1 to 3 show the structure of the device of the present invention. A flame cutting torch or other cutting device 11 is supplied with the gases whose combustion provides the high temperature cutting flame by way of suitable tubing 12 from pressure cylinders or other sources, not shown. Torch 11 is carried by a carriage 15 sliding on a fixed boom or arm 17, and is adapted to be moved laterally with respect to the steel plate or other work being cut, by connection to a flexible steel tape 13 which is continuously wrapped about a pair of drum pulleys 14, 16 rotatably fixed at either end of arm 17 by means of suitable brackets and bearings 18, 19. Pulley 14, and hence torch 11, is driven from a suitable electric motor 20 through reduction gearing 21, 22, in the manner shown in Figs. 3 and 4, described below. Accordingly, torch 11 is continuously moved laterally so long as motor 20 rotates, and at a rate proportional to the speed of motor 20. Motor 20 is preferably but not necessarily chosen to be a constant speed motor, such as of the three-phase induction type, and torch 11 will be moved by an amount proportional to the angular rotation of motor 20 and in a direction corresponding to the sense of rotation of motor 20. A plugging switch 25, for controlling stopping of motor 20 as will be described, is also driven from motor 20.

Also driven from motor 20, as by being coupled to a gear box 22 through further gearing 23 and an electromagnetically operated reversing clutch 24, is a control drum or cylinder 26 adapted to carry helical control records 27, 28, 29 which control the operation of torch 11 in the manner to be described below. In this way drum 26 and its control records are rotated synchronously and proportionately to the rotation of motor 20 and the motion of torch 11. Clutch 24 is adapted to reverse the relative directions of rotation of drum 26 and motor 20, according as one or the other of its two control solenoids (not shown) are energized, as will be described. When both solenoids are energized, the drum 26 is disengaged from motor 20. Clutch 24 may be of any suitable type well-known in the art and its details form no part of the present invention.

Cooperating with each of the records 27, 28, 29 of drum 26 is a corresponding photoelectric scanner, comprising respective light sources 31, 32, 33 each adapted to project a narrow pencil or ray of light upon its corresponding record, to be reflected therefrom into respective photoelectric cells 34, 35, 36, which sense the presence of light-reflecting marks on the records, and convert them into corresponding current impulses which are led by cables 37, 38, 39 to an amplifier and relay control box 41, whose circuit is shown more in detail in Figures 8A and 8B. These scanners are translated longitudinally of drum 26 in synchronism with the rotation thereof, as by a suitable screw shaft and travelling nut arrangement 45 driven together with drum 26 from motor 20, whereby each scanner executes a helical path relative to drum 26, along which path the presence or absence of reflecting marks form the control records mentioned above. The drum is preferably made of black material and the control marks of light-reflecting substance, such as aluminum paint.

For providing longitudinal movement of the torch 11, the entire apparatus thus far described is mounted on a carriage or moving platform 42 provided with wheels or rollers 43 cooperating with fixed rails 44, whereby carriage 42 may be readily moved along rails 44. The motive power for carriage 42 is provided by a second motor 46 mounted on carriage 42, which drives a pinion 47 engaging a fixed rack or cog-rail 48 through suitable reduction gearing 49. Accordingly, the energization of motor 46 will produce rotation of pinion 47 and will drive motor 46 and carriage 42 along rails 44 and cog-rail 48. A plugging switch 30 is also driven from motor 46.

A second control drum 51 is also provided, driven in synchronism with motor 46 and the movement of carriage 42 (and hence with the longitudinal motion of torch 11), as by means of a pinion 52 engaging rack 48. Accordingly, as carriage 42 moves along rack 48, pinion 52 is rotated, thereby rotating drum 51 through a reversing clutch 53 similar to clutch 24. Drum 51 is also provided with three photoelectric records 54, 55, 56 similar to records 27, 28, 29 of drum 26, which cooperate with scanners 57, 58, 59 mounted on a travelling support 50 similar to 45 to yield respective control signals which are led to control box 41 by cables 61, 62, 63. Also connected to control box 41, as by cables 64, 66, are the motors 46 and 20, which are thereby controlled from drums 26 and 51 in the manner to be described, to cause torch 11 to trace any desired outline, corresponding to the records on drums 26 and 51. The operation of the system is controlled from a manual control box 65, preferably made portable and joined to control box 41 by a cable 70. Manual control box 65 contains all necessary switches and controls for operating the system in any desired manner.

The lateral control of torch 11 is shown more in detail in Figs. 3 and 4. The flexible tape 13 is fixed at one end to drum 14 as by a pin or bolt 81, and is wrapped therearound in the form of a helix 82. In order for the tape to remain flat on the drum, it is necessary that it form a small acute angle with a normal to the drum as it unrolls from the drum. This angle is shown greatly exaggerated in the figure, and is actually very small, of the order of about one degree. For this reason, the arm or boom 17 is disposed at an acute angle with respect to the axis of rotation of drum 14. Preferably, boom 17 is perpendicular to the direction of motion of carriage 42, so that the axis of rotation of drum 14 is necessarily not along this direction. The tape 13 is fixed, as will be described, to the sliding block or carriage 15, which is guided along arm 17 by suitable flanges 83, 84, as shown more clearly in Fig. 4, or by any other suitable means. Rollers may be provided to facilitate the movement of carriage 15.

Another section 13a of tape 13 is fastened to the other end of the sliding block 15, as will be described, and extends therefrom over the idler drum 16, and thence back to the drum 14, to which it is also fastened, as by suitable fastening means 86. Drum 14 may be made in two separate sections 14, 14a, as shown, rigidly fixed together. Tape 13 is made to lie fully flat on each of the drums.

It will be clear that as drum 14 turns, one end of the tape 13 will be wrapped around drum 14, and the other end will be unwrapped from the drum. In the position shown in full lines in Fig. 3, the slide block 15 is at the in-most position, and the right part of the drum 14 is fully wrapped by the tape, while the left end 14a is fully unwrapped. In the extreme outmost position of the slide block 15, as shown in dotted lines, the tape will be fully unwrapped from the right part of drum 14 and wrapped upon the left part 14a. In so doing, however, it will be seen that the tape must move to the right with respect to arm 13, in order not to slip with respect to the drum, which slipping would throw the torch 11 and record drum 26 out of register, and would impair the accuracy and usefulness of the apparatus. To permit this side motion, the points of connection of the tape 13, 13a to the slide block 15 are not fixed to the block 15, but are made movable with respect thereto, as by means of auxiliary slides 87 and 88 slidably mounted on respective slide rails 89 and 90 fixed to slide block 15 transversely of arm 17. In this manner it is assured that the force applied to the torch-carrying slide block 15 will always be in the direction of desired motion of the torch, exactly along arm 17, thereby producing an easy and accurate control of the lateral motion of the torch 11 within narrow limits of variation.

To further assure that the tape 13 always aligns itself along the arm 17, the auxiliary slide blocks 87 and 88 are provided with projecting pins on the lower sides thereof, one of which, 91, is shown in Fig. 4. These pins are guided by a guide groove 92 fixed to the arm 17, so that as the tape 13 unwinds from the drive drum 14 and the slide block moves along arm 17, the guide groove 92 forces the pins 91 and hence the auxiliary slide blocks 87, 88, laterally with respect to the arm 17, in the proper proportion to maintain the tape 13 in the desired alignment along arm 17 at all times. It will be clear that for this purpose guide groove 92 must extend perpendicular to the axis of drum 14, and the pins 91 must be offset from the tape-fastening points in opposite senses to cooperate with groove 92.

The manner in which the present system operates may best be explained by reference to the diagram of Figure 5, in which arrow 66 indicates the direction of longitudinal motion of torch 11, and arrow 67 indicates transverse or lateral motion. For simplicity, let the corresponding motors which produce these motions be termed the A and B motors. The records on the A drum (such as control drum 61) are shown in developed form in Figure 7, and will be respectively designated as the A-distance record 54, the B-reversal record 55 and the A-stop record 56, for reasons which will appear below. The B-drum records 27, 28, 29 are similarly shown in Figure 6 in developed form, and are similarly designated, as shown. As will be described, the A and B motors operate alternately, one stopping as the other starts.

If it be desired that the torch 11 execute or trace the outline M—N—P—Q—R—M of Fig. 5, starting from point M, then along M—N, only the A motor need operate, to trace the required outline. Let it be assumed that the A-drum records 54, 55, 56 are at position $m$ relative to their respective scanners when torch 11 is at M. Then the A motor is started in the manner to be described, and drives the torch along M—N, and simultaneously moves the A scanners along their respective records. This action continues until a change in motion is required, as at point N. There it is required that the A motor stop and that the B motor start to execute N—P. This is done by a control mark $n$ on the A-distance record 54 on the A drum, which is sensed by its scanner and operates suitable relays, to be described, to stop the A motor and to start the B motor.

The B motor now runs, moving the torch along N—P. It will be understood that now the A-records are stationary. At P, another change in motion is required, and a control mark $p$ on the B-distance record 27 on the B drum actuates its scanner to stop the B motor and start the A motor. It will be clear that any desired figure having sides along the A and B directions may be executed in this manner, by alternating the operation of the A and B motors.

From P to Q, however, a slant line is to be executed. This may be performed by a succession of steps, in which the "treads" represent incremental displacements of the torch in the A direction and the "risers" correspond to increments in the B direction. Thus, if only two steps between P and Q are sufficient, as if only a crude approximation to the exact shape of the outline is required, the control mark $p$ just described will start the A motor, which will run until the mark $p_1$ and point $P_1$ is reached, when the A motor will stop and the B motor will start, running until mark $p_2$ and point $P_2$ is reached, when again the A motor is started, and runs to $P_3$, when it is stopped by mark $p_3$, which then causes the B motor to run until point Q and mark $q$ are reached.

If desired, a larger number of smaller steps, as shown at 45, may be used.

In this manner any number of steps may be executed, resulting in as close an approximation to line P—Q as is desired. In actual practice, increments as small as $\frac{1}{32}$ inch are being used. The serrations resulting from such small increments are effectively smoothed by the action of the torch, and the result appears as a substantially smooth straight line P—Q.

Up to the present point, all motion, both in the A and the B directions, has been in the forward direction. At Q, however, it is necessary to actuate the A motor in the reverse direction to execute Q—R. This is done by the second B record 28, termed the A-reversing record. Just before the position of mark $q$ on the B drum, a reversing-control mark $q'$ is placed on the A-reversing record 28. This mark $q'$ is sensed by its scanner, and actuates a suitable reversing mechanism, as will be described, so that when mark $q$ starts the A motor in the manner already discussed, its direction of rotation will be in the opposite sense.

Such a reverse direction of rotation would normally reverse the motion of the A scanners relative to their drum, so that the scanners would travel from $p_3$ to $p_1$ relative to the A drum, resulting in merely retracing the same outline M—N—P—Q, but in reverse sense. To avoid this, the direction of rotation of the drum relative to the motor must be reversed, so that, although the motor and torch reverse their direction of motion, the drum continues in the same direction and new parts of the records become effective instead of repeating the previous portions in reverse. This is also done under the control of mark $q'$, which operates the appropriate reversing clutch 24 or 68. It will be noted that all reversing of the A motor or A drum is done by the B record, at times during which the A motor is stationary and de-energized, so that no dynamic or power switching is required, and no slipping at the clutch occurs, resulting in a much simpler and more effective and efficient system. Mark $q'$ is made as a strip rather than a spot, and maintains the reversed condition so long as the strip stays opposite its scanner.

The A motor is thus started, in the reverse direction, and torch 11 traverses portion Q—R of the outline while the A scanners continue in the same direction relative to the A drum. At R, mark $r$ on the A record stops the A motor and starts the B motor. Since the B motor must rotate reversely, a reversing-control strip mark $r'$ on the reversing record 55, positioned ahead of spot mark $r$ of the distance record 54, acts to condition the B motor to rotate in a reverse direction when energized by spot $r$. In a manner similar to that described above, mark $r'$ also maintains the drive to the B drum reversed, to maintain its forward rotation even though the torch is moved backward.

From R to M, a curve is to be executed. This may be done in steps similar to P—Q, the steps again being chosen of the proper size to provide the desired accuracy. A number of exaggeratedly large steps have been shown in Figures 5–7. Thus, at R, control mark $r$ on the A record starts the B-motor (in reverse, due to mark $r'$) which thereby traces R—R₁, until stopped by control mark r₁. All this time the A motor is maintained in reverse by control strip q'. It is noted that strip q' may be formed as a series of marks each opposite one mark of the B-distance record, since in this way also the A motor can be maintained reversed, as required.

At R₁, mark r₁ stops the B motor and starts the A motor, still in reverse, to execute R₁—R₂, until stopped by mark r₂. This also starts the B motor, still in reverse because of control strip r', to execute R₂—R₃. This process is repeated in similar fashion, until point R₆ is reached.

At R₆, control mark r₆ on the A-distance record 58 starts the B motor. This is still in reverse, since the control strip r' is still opposite its scanner. Hence the B motor executes R₆—R₇, where control mark r₇ stops it and starts the A-motor. Since the A motor must now rotate forwardly along R₇—R₈, the A reversing control strip q' is terminated before r₇. It will be seen that this strip may end any time after r₆.

Hence now the A motor will rotate forwardly along R₇—R₈, until stopped by mark r₈, which starts the B motor to execute R₈—R₉. This is still in the reverse B direction, however. The same action continues therefore until the outline is closed at M.

If the entire outline is considered as executed by a succession of steps, each step comprising one increment of A motion and one of B motion, it will be seen that the ends of these steps are points P, P₂, Q, R₁, R₃, R₅, R₇, R₉. In the illustrative example used, some of these points, such as P, P₂, Q, fall directly on the required outline, while others (R₁, R₃, etc.) fall within the outline and still others (R₇, R₉) are outside the outline. Therefore, in laying out these steps, care must be taken to determine which points of the actual outline correspond exactly to points of the desired outline, in order to assure that these points be accurately located.

Also it will be noticed that for some parts of the traced outline, such as P—G and R₆—M, excess area is left outside the desired outline, while for other sections (R—R₆) the internal area is reduced. In laying out the control marks, it is desirable to have all excess area outside, as when the outline of the steel plate is important, or to have all steps within the outline, as when a hole is to be cut, so that further fairing or adjustment may be simply made, as by grinding away excess material if a finer finish is desired or required. This may be easily done by suitable choice of the intermediate points of the curve. Thus, instead of proceeding along Q—R—R₁—R₂, this same curve may be executed along Q—R'—R₂, thereby changing from an internal step to an external step.

In this manner, the torch 11 may be automatically controlled to execute any desired outline or curve, by alternate operation of the two motors, each serving to stop itself and to start and reverse the other, under the control of their distance and reversal records.

Under some conditions it may be desired to stop the automatic traversal of the outline at predetermined points, as where it is desired to indicate the exact point at which a bulk-head is to be positioned. This may be done under the control of the stop records 29 and 56. Thus, if such a stop is required at point P₂, a stop control mark P₂'' is placed on the B control record 29, since that is the only record moving just before P₂. In the manner to be described with respect to Figs. 8A and 8B, this stops the torch without removing its control, so that tracing of the exact same outline by the torch may be resumed merely by properly restarting the apparatus.

If a stop is desired at point R₄, for example, where the A motor is the last to run, the stop mark r₄'' is placed on the A stop record 56, as shown in Fig. 7.

At the end of the outline or curve, as at M if the curve is closed, stop marks m₁'' are placed on both the A and B records, and serve to completely disable the apparatus, to inform the operator that the cut is ended.

Referring now to Figs. 8A, 8B, and 8C there is shown the complete wiring diagram of the automatic control system for the torch, in its deenergized condition, wherein all relay contacts are open except those designated by a diagonal line therethrough. Considering first motor A, providing the longitudinal motion of the cutting torch, it will be seen that motor A is adapted to be driven in a forward or reverse sense from a power source shown as a three-phase power line P₁, according as its relay contacts A1—1, A1—2, A1—3 or A2—1, A2—2, A2—3 are closed by their respective forward and reverse motor control relay coils A1 or A2. A similar forward or reverse control of motor B producing the lateral or transverse motion of the torch is provided by contacts B1—1, B1—2, B1—3 and B2—1, B2—2, B2—3 of the B motor control relays B1 and B2.

Upon starting the cutting operation, in which the torch is controlled from the records as described above, the switch 101 is thrown to its manual position M, whereby power is applied to the two lines L₁ and L₂. At the same time all the clutch solenoids, namely the forward A clutch solenoid ACF, the reverse A clutch solenoid ACR, the forward B clutch solenoid BCF and the reverse B clutch solenoid BCR, are energized by the normally closed contacts AM—2 and AM—3 of relay AM, which is now deenergized, and the closed contacts AR—4 and BR—4 to be described. Hence clutches 24 and 53 of Figures 1-3 are completely disengaged, and their respective drums are free from actuation by the A and B motors. These drums are now adjusted so that the initial points of their records are all opposite the corresponding scanners or pickups. Then the torch is adjusted to the initial point of the work at which cutting is to start; that it, to the point of the work corresponding to the setting of the drums just performed. This may be done by the proper actuation of the A and B forward and reverse manual control switches, such as the A-forward switch 102, the A-reverse switch 103, the B-forward switch 105 and the B-reverse switch 104, which respectively energize the relays A1, A2, B1, and B2 controlling the motion of the A and B motors in these respective senses, by connecting these relays to lines L₁ and L₂, now connected to source P₂. In this way, the drums and torch are put into correspondence or register at the beginning of the cut. As will be seen, the drums and torch thereafter never leave register, until the cut is completed.

After this initial adjustment is made, switch 101 is thrown to its automatic position A. This disconnects line L₂ from power source P₂, and energizes the coil of relay AM, so that its contacts AM—1 close and energize line L₃, and its contacts AM—2 and AM—3 open to energize only the A and B forward clutch solenoids ACF and BCF through the normally closed contacts AR—4 and BR—4 of the AR and BR relays to be described, whereby the drums will rotate in forward sense when their motors rotate forward.

The start switch 106 is then closed, and energizes the A holding relay AH to close its contacts AH—1 and AH—2, and to open its contacts AH—3. Since contacts AS—1, SA—1 and SB—1, to be later described, are normally closed, in the absence of energization of their respective relay coils AS, SA and SB, the closing of contacts AH—1 closes a holding circuit which maintains relay AH energized even though the start switch 106 be released. Thus switch 106 may be of the momentary contact type.

The closing of contacts AH—2 serves to energize the forward A relay A1 through the normally closed contacts SB—1, AS—1, SA—2, AB—1 and RA—1, and the normally closed forward A limit switch 107. Switch 107 provides means for interrupting the forward motion of the A motor in response to overtravel, in the well known manner, to increase safety of operation.

The opening of contacts AH—3 isolates the "plugging" or braking circuit of motor A, to prevent undesired operation thereof.

The energization of relay A1 by contacts AH—2 serves to start the A motor in the forward direction, by closing contacts A1—1, A1—2, A1—3, and thereby connecting motor A to line P1 for forward rotation. At the same time, contacts A1—4 are opened. As will be seen, these contacts A1—4 control the application of braking to motor A. Preferably relays A1 and A2 are interlocked so that only one can operate at a time.

The forward rotation of the A motor and its control drum proceeds until the A distance control scanner 110 (Fig. 8C), cooperating with the A distance control record 54 on the A drum, senses a mark (corresponding to n of Fig. 7), which preferably is in the form of a light-reflecting spot, by means of light reflected from a source 109 by this spot into the photocell 108. The current impulse thereby produced is amplified by a suitable amplifier 111, which may be as shown in our copending application Serial No. 349,968, filed August 2, 1940, now Patent Number 2,336,376, dated December 7, 1943, and then actuates the A-stop relay AS. This energization of relay AS closes its contacts AS—2 and AS—3, and opens its contacts AS—1. It is to be noted that this energization will probably be only momentary, since the mark is of small dimensions, and the inertia of the system would tend to rotate the scanner past the mark before being stopped.

The opening of contacts AS—1 de-energizes the A holding relay AH, which drops out, thereby opening its contacts AH—1, AH—2, and closing its contacts AH—3. Since start switch 106 is no longer closed, it will be clear that relay AH will be kept de-energized, since its holding contacts AH—1 are opened, even though contacts AS—1 should again close.

The opening of contacts AS—1 also de-energizes relay A1, with whose circuit these contacts are in series, so that relay A1 drops out and de-energizes motor A. The opening of contacts AH—2 in series with contacts AS—1 assures that this circuit will be kept open even though relay AS should not stay energized, due to the scanner moving past the control mark. Contacts AH—2 thus insure that relay A1 remains de-energized thereafter.

The reclosing of contacts AH—3 places the plugging switch 112 in circuit with the energization of motor A, under the control of contacts A1—4. Switch 112 is responsive to rotation of motor A, and, for a forward rotation of motor A, closes its upper contacts so long as the motor continues to rotate above a predetermined speed. This switch may be of the type commercially known as the General Electric plugging switch type CR 2962A. Hence, after relay A1 has been de-energized, reclosing its contacts A1—4, energy is supplied to relay A2, which thereby impresses reverse power on motor A, so as to brake the motor to a standstill. As the motor reaches low speed switch 112 falls out, whereby relay A2 is de-energized and reverse rotation of the motor is prevented, so that the motor stops practically dead. Contacts A1—4 prevent operation of relay A2 until after relay A1 has opened.

The momentary energization of relay AS also closes its contacts AS—2, thereby energizing the B forward motor control relay B1 through normally closed contacts SB—1 and SA—1, the closed contacts AS—2, normally closed contacts SA—2, AB—3 and RB—1 and the normally closed B-forward stop switch 113. It will be clear that switch 113 provides means for manually interrupting the energization of relay B1 and hence the forward motion of motor B whenever desired.

The energization of the B forward motor control relay B1 serves to start the forward rotation of the B motor by closing contacts B1—1, B1—2, B1—3. Also contacts B1—4, similar in function to A1—4, are opened, disabling the B reverse motor control relay B2 insofar as the plugging circuit is concerned.

However, as discussed above, the energization of relay AS and hence the closing of contacts AS—2 may be only momentary. To insure proper operation of the system, the closing of contacts AS—3 energizes the B holding relay BH through contacts SB—1 and AS—3, thereby closing its contacts BH—1 and BH—2, and opening contacts BH—3.

Contacts BH—1 serve as a holding circuit to maintain relay BH energized despite de-energization of amplifier-operated relay AS. Contacts BH—2 serve as a holding circuit for relay B1 to insure continued rotation of the B motor. Contacts BH—3 open to further isolate the B motor plugging circuit.

In this manner, the A motor is rapidly stopped, and the B motor starts to drive the flame cutter in a perpendicular direction to provide a further increment to the desired outline or curve.

Rotation of the B motor also drives the B drum in a forward direction. This operation continues until a control mark on the B-distance control record 69 on the B drum is intercepted by the corresponding scanner, whereupon the B-stop relay BS is energized, at least momentarily, to close its contacts BS—2 and BS—3 and to open contacts BS—1.

The function of the B-stop relay BS is similar to that of the A-stop relay AS. In brief, the B-forward motor control relay B1 is de-energized, and the B plugging circuit is conditioned to be operated by the B plugging switch 114, similar to switch 112, to instantly stop the B motor. In addition, the B holding relay BH is deenergized to fall out and to keep the B1 relay de-energized even after relay BS falls out. Also, the BS relay energizes the A holding relay AH and the A forward motor control relay A1 to initiate and maintain forward rotation of the motor. The action is entirely similar to that of the corresponding A relay AS, merely reversing the A and B roles.

In this manner the A and B motors automatically alternate operation, each running for a period defined by the interval between marks on the distance record of its corresponding drum, but the starting of each of these periods being controlled by the record of the opposite drum. Thus, the starting of each motor is initiated by a mark on the opposite drum record, and each motor is stopped by a mark on its own drum record.

As thus far described, the A and B motors operate alternately to execute the desired curve of the outline, in the forward direction. For reversing the direction of the motors, the respective drums are each provided with a second or reversing control record, and a corresponding photoelectric pickup or scanner unit, as described above. These are similar to unit 110, and are indicated schematically in Fig. 8C by the dotted lines 121, 122.

In the above description, it has been tacitly assumed that the retrace switch 123, whose function will be described below, was in the forward position, as shown, so that relays RA and RB were de-energized. Let it be further assumed that one motor, such as the A motor, is operating, and that the next operation of the B motor is to be in the reverse direction. Then, just before the A-stop control mark on the A drum actuates relay AS to stop the A motor and start the B motor, in the manner already described, a B reversing control mark (corresponding to strip r in Fig. 7) also on the A drum, but on the reversing control record 55 thereof, energizes the B reversing control relay BR, through the action of its corresponding scanner. This closes contacts BR—1 and BR—3, and opens BR—2 and BR—4.

Contacts BR—1 energize the B reversing relay RB through the now closed contacts AM—1, and thereby closes its contacts RB—2 and opens contacts RB—1. In this way the B reverse motor control relay B2 is conditioned to be subsequently operated by the A-stop B-start relay AS, while the B forward motor control relay B1 is disabled. Accordingly, upon subsequent stopping of the A motor and starting of the B motor, the B motor will rotate in reverse sense from its previous rotation.

Since the drums and motors are directly geared together to rotate in synchronism, it will be seen that reversal of the direction of rotation of a motor would also reverse the direction of rotation of the corresponding drum, so that the records on the drum would be repeated by traversal in reverse sense. This would merely cause the torch to traverse the same increments but in reverse order, no matter what the other motor was doing. To prevent this, it is necessary to reverse the relative directions of rotation of the motor and drum, so that the drum will continue to rotate in the same direction even though the motor has reversed. This is done, in the present illustration, by actuation of the BR relay, which closes its contacts BR—3 and opens BR—4, thereby de-energizing the B forward clutch solenoid BCF and energizing the B reverse clutch solenoid BCR to reverse the direction of rotation of the B drum relative to the B motor.

The reversing control mark is preferably placed on its record at a point to be intercepted by its scanner at a time before the distance control mark is effective, so that the reversing operations may be completed before stopping and starting occur. It is to be noted here also that the reversing control of the B motor is done by the A record, and vice versa, so that the motor being reversed is at standstill, thus avoiding the necessity of reversing a moving system with its consequent complexities of power and kinetic energy control. Also, accurate registration between drum and torch is maintained by clutching only at standstill, when no slipping can occur.

Contacts BR—2 are ineffective to produce any result in the illustration used, but become useful when switch 123 is thrown to the retrace posion, as will be described.

Since relay BR will remain energized only so long as a reversing mark is sensed by the B reversing scanner, it will be clear that this mark may be in the form of a line extending in the direction of motion of the A drum for a distance corresponding to the distance it is desired to maintain the B motor in reverse rotation, as described above.

It will be seen that reversal of the A motor is accomplished in a similar manner by a reversing control line or strip on the reversing record of the B drum, which operated through its scanner to actuate the A-reversing control relay AR to control the motor reversing relay RA, and thus replace the relay A1 by the relay A2, and also to actuate the clutch solenoids ACF and ACR to reverse the drum rotation relative to the motor rotation.

In the above manner the A and B motors may be automatically controlled by their respective drum records to execute any desired curve or outline. By making the intervals of operation of each motor rather short, it is possible to have the cutter describe very complicated and intricate outlines with a high degree of fidelity, even though microscopically the actual path of the cutter would be seen to be zig-zag.

Under some conditions, as for example when the flame has gone out without being noticed, or for other reasons, it may be desirable to have the torch retrace the same path. This may be done simply by throwing retrace switch 123 to its retrace position. This energizes both relays RA and RB through AR—2 and BR—2 now closed and thereby serves to effectively interchange relays A1 and A2, and relays B1 and B2, so that whichever motor is operating will be run in the reverse direction. Since the drum clutches are not affected, the drums as well as the torch will be operated in reverse. Thus, for example, referring to Figures 5 to 7, if the retrace switch 123 were actuated when the torch is between R and Q, the torch would at once return toward Q. At the same time, the A scanners would be moving to the left in Figure 7, instead of to the right as formerly. At $p_3$ the B starting action described above would occur, and the A motor would stop. Since relay RB is now energized by switch 123, contacts RB—2 are closed and contacts RB—1 open, so that the B motor will operate in reverse, along $QP_3$. Now the torch goes along Q—$P_3$, and the B scanners traverse the B records upwards in Figure 6, instead of downwards as before, from $q$ to $p_2$. In so doing, the A reversal scanner on the B drum leaves the control strip mark $q'$, thereby de-energizing relay AR to reverse the A-drum drive, and energizing relay RA to reverse the A motor direction upon its operation in response to mark $p_2$.

During normal operation of the device, the scanner will travel past the distance control mark before stopping. Accordingly, when retracing, the scanner will be actuated by the same control mark, and will improperly interchange A and B directions of motion at the beginning of retracing. To prevent this, the drums may be rotated slightly by hand before beginning retracing, by the amount necessary to put the scanners on the other side of the control mark last reached.

In some operations it may be desirable to stop the torch at predetermined points of the outline, as for the purpose of placing or punching marks on the work to indicate special points, as points where bulkheads, etc., are to be placed. If the master power switch or any of the manual stop switches were opened at such points, the system might restart thereafter with the wrong motor operating, or on the "wrong foot." To prevent this, and to automatically stop at the required point so that the operator can have no opportunity to overlook the marking point, a third or "punch-stop" record is placed on each of the A and B drums, as shown at 29 and 56 in Figures 5 and 6, cooperating with respective scanners indicated schematically in Figure 8B.

Assuming for example that the A motor is operating, the control mark on the A punch-stop record, such as $r_4$ of Figure 7 will actuate the punch-stop relay SA, thereby closing its contacts SA—3 and opening SA—1 and SA—2. Contacts SA—2 disable both the A motor control relays $A_1$ and $A_2$, so as to prevent the energization of either one. Contacts SA—3 energize the stop holding relay AB, which, through its contacts AB—4, holds itself energized, the manual restart switch 124 being normally closed.

Relay AB also closes its contacts AB—2 and opens AB—1 and AB—3. Contacts AB—3 are in series with SB—2, and serve to maintain the B motor inactive, even though the SB relay should not stay energized, as might occur because of inertia in the system permitting the scanner to overrun the control mark. Contacts AB—1 serve to de-energize the A motor, no matter what its direction of rotation, being in the common lead for both the A1 and the A2 relays controlling both directions of rotation of the A motor.

At the same time, contacts AB—2 serve to apply plugging to the A motor through contacts BH—3, AB—2, switch 112 and the proper contacts A1—4 or A2—4, depending on which of relays A1 or A2 is energized to rotate the A motor. As soon as the A motor is stopped, both motors remain stopped, since the plugging circuit is no longer effective to apply power to the A motor, which is otherwise open-circuited by AB—1, and since motor B is open-circuited by AB—3.

If the B motor were running, a control mark such as $p_2''$ on its punch-stop record in Fig. 6 would operate its stop relay SB to energize relay AB, which would act as already described to disable the stationary A motor to prevent its possible energization, and to stop the rotating B motor. Contacts AB—2 will be seen to operate the plugging for both motors, since at least one of contacts AH—3 or BH—3 will always be closed, in accordance with the particular motor which is rotating.

To restart the system after being thus stopped, manual restart switch 124 must be actuated, which de-energizes the AB relay, and permits the system to resume operations at the point where it left off when stopped. That is, the same motor will again start and in the same direction, since the holding relay AH or BH corresponding to the motor operating when stopped, has remained energized. In this way, the motion of the torch is automatically stopped at the proper point, and the attention of the operator is at once attracted, since the system can be restarted only by manual actuation of switch 124.

If it is desired to stop the machine completely, as at the end of the cut, end-stop marks $m_1''$ (Figs. 6 and 7) serve to energize both relays SA and SB to stop both motors. Moreover, at this time the restart switch 124 is no longer effective to restart the machine, since both holding relays AH and BH remain opened and completely disable both motors.

If it is desired to manually stop the system and in a manner to permit resumption of the same outline, as when the torch goes out, for example, stop switch 125 may be actuated to energize relay AB, which will then operate to stop the system in the manner described, no matter which motor is operating or in which direction the motor is rotating. The system may be restarted as before by switch 124.

It will be noted that, during manual control, when switch 101 is in its manual position M, relay AB remains energized. This operates to open its contacts AB—1 and AB—3, so as to isolate the system against indirect energization of the motor control relays through other relay contacts.

Thus far it has been tacitly assumed that the proper control records exist, without discussing the manner in which these records may be produced. Of course, the records could be made by hand from a knowledge of the required outline and the proper computations, in accordance with the discussion relative to Figs. 5 to 7. Preferably, a different and simpler method, usable by any operator without excessive instruction, is employed. For this purpose, apparatus is provided for manually controlling the A and B motors, whereby the torch or an index member substituted therefor may be manually controlled to execute the outline or curve. A template is made up, bearing the desired outline, or the outline is drawn on a plate or on the floor, and the motors are controlled in such manner that the torch or index member traces the template or drawn outline. At each point where a change in the direction of the torch is required, a proper mark is placed on the correct drum record which is actuated synchronously and in register with the corresponding motor. Such a mark may be placed manually after stopping the motion of the index, or may be made by a suitable controlled scriber, as shown in our copending application Serial No. 349,968, filed August 2, 1940, now Patent Number 2,336,376, dated December 7, 1943.

It is noted that for straight slanted portions of the outline, such as P—Q, or curved portions such as R—M, it is not necessary to trace the entire curve by the index, making record marks at each change. Rather, for straight portions such as P—Q it is merely necessary to place the index at point P and mark the proper drum at that point, and repeat at point Q. Then the drums may be completed after removal from the machine by adding the further necessary marks by dividing the record intervals corresponding to P—Q into a number of equal parts corresponding to the desired number of steps, a mark being placed at each of these subdivisions on each of the records.

Curved portions such at R—M may be resolved into a number of essentially straight portions such as R—R2, R2, R4, etc., the number of portions being determined by the curvature of the outline and the required accuracy. Each of the points R, R2, R4, etc., would then be accurately marked on the drums, and the intervening control marks added by equal subdividing. Of course, the points R2, R4, etc., would be chosen so that the required accuracy of tracing of the outline could be maintained. In effect, the curve is replaced by an equivalent polygon, which, as is well known, approximates a curved outline as the number of sides is increased.

As a further method of approximating the actual outline, the intervals between the accurately located points may be unequally subdivided, so that the actual curve is then replaced by an approximating curve. With experience, it is possible to determine the rule or law of subdividing to yield the best approximation to the theoretical curve.

It is moreover not necessary to use a full-size template outline in this method. By changing the gearing in the drum drives, a small-scale template may be used to make the record, in the manner described above. Then, by restoring the original gearing, the machine will execute the full-size outline. This produces a great saving of time and money, especially in the ship-building art where it has been customary to first make a small-scale model, and then to make a full-size template for each plate thereof, which may be as large as seven feet wide by thirty feet long or even larger. The cumbersomeness of such a method is obvious. By the present apparatus, the "blowing-up" of the scale model may be eliminated, and the template may be made by scaling dimensions directly from the model.

The present apparatus also avoids the necessity for marking the plate to be cut, which consumes appreciable time and energy in prior methods, since control of the torch is only by means of the control drums and records. This is in marked distinction to the prior art, wherein the plate is punch-marked through the template, requiring extra help in the marking of the plate. Also, in the prior art the operator had to both guide the torch and control the flame, which made his job extremely difficult, requiring a high degree of skill and experience, whereas in the present system, the operator need only adjust the flame, since the machine fully guides the torch.

Fig. 9 shows the circuit for controlling the apparatus during the process of record-making. It is to be understood that relays A1, A2, B1, B2 and the clutch solenoids ACF, ACR, BCF, BCR are disconnected from the circuit of Figs. 8A, 8B and 8C and are connected as shown in Fig. 9. This may be conveniently done by means of suitable jacks and plugs, not shown.

In Fig. 9, there is provided an A control switch 201 and a B control switch 202. Each of these switches has a forward, a reverse and an off position, being shown in the figure as in the off position, where all relays are de-energized and hence no motor rotates. In operation, the index replacing the torch is adjusted to the initial point of the template outline, preferably by the manual control of Figs. 8A, 8B and 8C. Then a blank record cylinder is inserted on its drive drum, and the control box of Figs. 8A, 8B and 8C is replaced by that of Fig. 9. Then the template outline may be traced by actuation of switches 201 and 202. Thus, if forward A motion is desired, switch 201 will be moved up to condition the A forward motor control relay A—1 and the A forward clutch solenoid ACF. Then motion is obtained by actuating the "go" switch 200. For reverse A motion, switch 201 is pushed down to condition relay A2 and solenoid ACR, thereby reversing the A motor but maintaining forward motion of the A control record, as is necessary. The B conditioning switch 202 and "go" switch 205 operate similarly. At each control point of the outline the proper mark may be made on the proper record.

During tracing of the outline, it is possible to overrun the control point. In such case, a reversal of the control switch 201 or 202 will not bring the system back to the control point, since the record drums will continue to rotate forwardly no matter what direction the motors rotate. To also return the drums to the control point after overshooting, while maintaining proper register, further A and B retrace switches 203, 204 are provided, which control the motor relays only, and do not reverse the clutches, so that both index and record will retrace upon actuation of the "go" switch.

In this manner, a record is made of each change in the condition (start and stop) and in the sense (forward and reverse) of each of the motors, and these records are then utilized to automatically reproduce the same sequence of operations of the A and B motors as was manually traversed, whereby the torch automatically traces the same outline.

As stated above, the outline thus manually traced need not be the exact outline it is desired to duplicate. By changing the gearing driving the drums from the motors by a predetermined ratio, the outline manually traced may be reduced in scale by the same ratio. Then, by replacing the original gearing after the record is made, the torch may, by the apparatus described, execute the full scale outline desired.

Also, the full outline need not be traced, but may be broken down into a number of essentially straight portions. Then only the junction points of these portions need be accurately recorded on the drum control records, and the intervening portions of the records may be added after removal from the machine, by subdividing the record increments into the required number of steps corresponding to the accuracy desired.

In this manner, we have described an extremely versatile device for performing automatic flame cutting operations. It is to be noted that, although the present system has been described specifically for flame-cutting operations, it may equally well be used wherever it is desired to automatically and/or repeatedly move a member about a predetermined outline or along a predetermined path, where the path may be of any arbitrary type.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

We claim:

1. Photoelectrically-controlled apparatus, comprising a tool, motive means for driving said tool in a predetermined direction, a first photoelectric control record driven synchronously with said tool by said motive means, a second motive means for driving said tool in a second independent direction perpendicular to said first direction, a second photoelectric control record driven synchronously with the motion of said tool by said second motive means along said second direction, said first record bearing control indicia having successive spacings corresponding to desired increments of motion of said tool along said first direction, and said second record bearing control indicia having successive spacings corresponding to desired increments of motion of said tool along said second direction, photoelectric pick-up means cooperating with said first record for stopping said first motive means and starting said second motive means under the control of said first control indicia, and photoelectric pickup means cooperating with said second record for stopping said second motive means and starting said first motive means under the control of said second control indicia, whereby said tool is operated in steps to execute an outline corresponding to both said control indicia.

2. Apparatus as in claim 1, further comprising a second set of control indicia on each of said records, and photoelectric pickup means cooperating with each of said second sets of indicia for reversing the direction of motion of the motive means corresponding to the other of said second sets of indicia while maintaining unchanged the direction of motion of the record corresponding to said other set, whereby said tool may execute a curve having both forward and reverse increments of motion along said two directions.

3. Apparatus as in claim 1, further comprising a further set of control indicia on each of said records, photoelectric pickup means cooperating with each of said further indicia for stopping both said motive means under the control of either of said further sets of indicia, and manual means for controlling resumption of operation of said motive means without affecting the synchronism of said motive means with their respective control indicia, whereby said apparatus may be automatically stopped by said further indicia at a point of said outline corresponding to the position of either of said further indicia on their respective records.

4. Apparatus as in claim 1, further comprising a second set of control indicia on each of said records, photoelectric pickup means cooperating with and controlled by each of said second sets of indicia for reversing the direction of motion of the motive means corresponding to the other of said sets while maintaining unchanged the direction of motion of the record bearing said other set, whereby said tool may execute a curve having both forward and reverse increments of motion along said predetermined directions, a third set of control indicia placed on each of said records, photoelectric pickup means cooperating with and controlled by each of said third sets for stopping both of said motive means, and manual means for controlling resumption of operation of said motive means without affecting the synchronism of said motive means with their respective records, whereby said apparatus may be automatically stopped by said third sets of indicia at points of said outline corresponding to the location of said third sets on their respective records.

5. Record-controlled curve-tracing apparatus comprising a tracing member, motive means for driving said member in a predetermined direction, a control record driven by said motive means synchronously with said member, a second motive means for driving said member in a second independent predetermined direction, a second control record driven by said second motive means synchronously with the motion of said member along said second direction, said first record bearing control indicia having successive spacings corresponding to desired increments of motion of said member along said first direction, and said second control record bearing control indicia having successive spacings corresponding to desired increments of motion of said member along said second direction, means cooperating with said first record for stopping said first motive means and starting said second motive means under the control of said first control indicia, and means cooperating with said second record for stopping said second motive means and starting said first motive means under the control of said second control indicia, whereby said member is operated in steps to execute an outline corresponding to both said control indicia.

6. Record-controlled curve-tracing apparatus comprising a movable member, motive means for independently driving said member along a plurality of predetermined coordinates, respective control records driven by said motive means synchronously with said member and bearing indicia respectively corresponding to desired increments of motion of said member along said predetermined coordinates, and means controlled by said indicia for controlling said motive means to drive said member successively and periodically along said coordinates by increments corresponding to said indicia, whereby said member is operated in steps to trace a curve corresponding to said indicia.

7. Apparatus as in claim 6, further comprising further indicia carried by said records, and means controlled by said further indicia for reversing the direction of motion of said member along a respective coordinate while maintaining the same direction of motion of said records.

8. The method of tracing a curve having predetermined increments along two independent directions comprising the steps of preparing a pair of control records bearing indicia successively spaced in correspondence with said increments along respective directions, and alternately moving a tracing member along said respective directions by increments corresponding to the spacing of the indicia on respective records.

9. A device for executing a desired pattern comprising a movable member, a first motor for moving said member along a first rectilinear path, a second motor for moving said member along a second rectilinear path at a right angle to said first path, a first control member driven by said first motor and having indicia thereon, a second control member driven by said second motor having indicia thereon, detecting means associated with each of said control members for sensing the indicia thereon, and means electrically connecting the detecting means associated with said first control member with said first and second motors for stopping said first motor and starting said second motor when an indicium is sensed on said first control member, and means electrically connecting the detecting means associated with said second control means with said second and said first motors for stopping said second motor and starting said first motor when an indicium on said second control member is sensed.

10. A device for executing a desired pattern, comprising a movable member, first means for moving said member along a first path, second means for moving said member along a second path at an angle to said first path, first control means actuated by said first means for stopping said first means and starting said second means, and second control means actuated by said second means for stopping said second means and starting said first means.

11. A device for executing a desired pattern, comprising a movable member, first means for moving said member along a first path, second means for moving said member along a second path at an angle to said first path, first control means actuated by said first means and having control indicia for stopping said first means and starting said second means, and second control means actuated by said second means and having control indicia for stopping said second means and starting said first means.

12. A device for executing a desired pattern comprising a movable member, a first motor for moving said member along a first path, a second motor for moving said member along a second path at an angle to said first path, a first control member actuated by said first motor and having indicia thereon, a second control member actuated by said second motor and having indicia thereon, and indicia detecting means connected with said first and second motors for (1) stopping said first motor and starting said second motor upon detection of an indicium on said first control member and (2) for stopping said second motor and starting said first motor upon detection of an indicium on said second control member.

13. A device for executing a desired pattern comprising a movable member, a first reversible motor for moving said member along a first path, a second reversible motor for moving said member along a second path at an angle to said first path, a first control member actuated by said first motor and having indicia thereon, a second control member actuated by said second motor and having indicia thereon, and indicia detecting means connected with said first and second motors for (1) stopping said first motor and starting said second motor upon detection of an indicium on said first control member and (2) for stopping said second motor and starting said first motor upon detection of an indicium on said second control member, and additional detecting means connected with said motors for controlling the direction of operation of said motors by detection of indicia on said control members.

14. A device for executing a desired pattern, comprising a movable member, a first reversible motor for moving said member along a first path, a second reversible motor for driving said member along a second path at an angle to said first path, a first movable control member having indicia thereon driven by said first motor, means responsive to indicia on said first control member for stopping said first motor and starting said second motor in a forward or reverse direction, a second movable control member having indicia thereon driven by said second motor, means responsive to indicia on said second control member for stopping said second motor and starting said first motor in a forward or reverse direction, and reversible transmission means between said motors and their respective control members for rotating said control members in one direction, regardless of the direction of rotation of said motors.

15. A device for executing a desired pattern, comprising a movable member, a first reversible motor for moving said member along a first path, a second reversible motor for driving said member along a second path at an angle to said first path, a first movable control member driven by said first motor and having control indicia thereon, photo-electric cell means responsive to indicia on said first control member for stopping said first motor and starting said second motor in a forward or reverse direction, a second movable control member driven by said second motor and having indicia thereon, photo-electric cell means responsive to indicia on said second control member for stopping said second motor and starting said first motor in a forward or reverse direction, and reversible transmission means between said motors and their respective control members for rotating said control members in one direction, regardless of the direction of rotation of said motors.

WILLIAM S. TANDLER.
DAVID S. WALKER.

REFERENCES CITED

The following references are of record in the file of this patent:

UNITED STATES PATENTS

| Number | Name | Date |
|---|---|---|
| 521,262 | Elliott | June 12, 1894 |
| 1,658,927 | Krebs | Feb. 14, 1928 |
| 1,923,208 | Howey | Aug. 22, 1933 |
| 1,945,928 | Wilkins et al. | Feb. 6, 1934 |
| 1,974,513 | Scheidhauer | Sept. 25, 1934 |
| 2,029,335 | Oberhoffken et al. | Feb. 4, 1936 |
| 2,089,014 | Bucknam | Aug. 3, 1937 |
| 2,089,632 | Watson | Aug. 10, 1937 |
| 2,172,313 | Young | Sept. 5, 1939 |
| 2,213,108 | Pollard, Jr. | Aug. 27, 1940 |
| 2,238,082 | Somes | Apr. 15, 1941 |
| 2,261,644 | Cockrell | Nov 4, 1941 |
| 2,286,571 | Pollard | June 16, 1942 |

FOREIGN PATENTS

| Number | Country | Date |
|---|---|---|
| 513,848 | Great Britain | Oct. 24, 1939 |